United States Patent
Lee et al.

(10) Patent No.: US 7,645,566 B2
(45) Date of Patent: Jan. 12, 2010

(54) SULFUR-CONTAINING DISPERSANT AND SULFIDE PHOSPHOR PASTE COMPOSITION COMPRISING THE SAME

(75) Inventors: Eun Sung Lee, Seoul (KR); Don Ik Lee, Icheon-Si (KR); Jae Young Choi, Suwon-Si (KR); Seon Mi Yoon, Yongin-Si (KR)

(73) Assignee: Samsung Electro-Mechanics Co., Ltd. (KR)

( * ) Notice: Subject to any disclaimer, the term of this patent is extended or adjusted under 35 U.S.C. 154(b) by 0 days.

(21) Appl. No.: 12/270,052

(22) Filed: Nov. 13, 2008

(65) Prior Publication Data

US 2009/0072198 A1      Mar. 19, 2009

Related U.S. Application Data

(62) Division of application No. 11/410,766, filed on Apr. 25, 2006, now Pat. No. 7,473,514.

(30) Foreign Application Priority Data

Oct. 20, 2005    (KR)    ............................... 2005-99064

(51) Int. Cl.
  *G03C 1/00*    (2006.01)
  *C09K 11/02*   (2006.01)
  *C07C 69/34*   (2006.01)
(52) U.S. Cl. ............... 430/286.1; 430/270.1; 430/281.1; 430/321; 252/301.36; 524/356; 560/195
(58) Field of Classification Search ............... 430/286.1, 430/270.1, 281.1, 321; 252/301.36; 524/356; 560/195
See application file for complete search history.

(56) References Cited

U.S. PATENT DOCUMENTS

2002/0160313 A1 *  10/2002  Park et al. ................... 430/321
2004/0178713 A1     9/2004  Na et al.

FOREIGN PATENT DOCUMENTS

| JP | 07-306425 | 11/1995 |
| JP | 07306425 A * | 11/1995 |
| JP | 2001-064540 | 3/2001 |
| JP | 2002-008517 | 1/2002 |
| JP | 2002008517 A * | 1/2002 |

* cited by examiner

*Primary Examiner*—David Wu
*Assistant Examiner*—Michael M Bernshteyn
(74) *Attorney, Agent, or Firm*—Cantor Colburn LLP

(57) ABSTRACT

A sulfide phosphor paste composition comprising a sulfur-containing dispersant, and a fluorescent film prepared therefrom, are provided. The sulfur-containing dispersant has a dual head structure containing both a carboxyl group and a thiol group or a structure containing a thiol or thiophene group as a head group. An oligomeric sulfur-containing dispersant is also provided. Adsorption of the dispersant on the surface of the sulfide phosphor prevents aggregation of the phosphor particles, and thereby improves the dispersibility of the sulfide phosphor paste composition, the homogeneity of the phosphor in the paste composition, and the density of a film produced from the paste composition. Fluorescent films and display devices produced from the phosphor paste composition exhibit improved luminescent properties and excellent processability.

2 Claims, 4 Drawing Sheets

_US 7,645,566 B2_

SULFUR-CONTAINING DISPERSANT AND SULFIDE PHOSPHOR PASTE COMPOSITION COMPRISING THE SAME

CROSS REFERENCE OF APPLICATION

This application is a divisional application of U.S. patent application Ser. No. 11/410,766, filed Apr. 25, 2006, which claims priority to and the benefit of Korean Patent Application No. 10-2005-0099064 filed on Oct. 20, 2005 in the Korean Patent Office, the entire contents of which are incorporated hereinto by reference.

BACKGROUND OF THE INVENTION

1. Field of the Invention

The present invention relates to compositions comprising sulfur-containing dispersants. Specifically, the present invention relates to a sulfide phosphor paste composition comprising the sulfur-containing dispersants.

More particularly, the present invention relates to a composition comprising a sulfur-containing dispersant which has a structure containing both a carboxyl group and a thiol group as head groups or a structure containing a thiol or thiophene group as a head group, and a sulfide phosphor paste composition comprising the sulfur-containing dispersant.

2. Description of the Related Art

In recent years, various display devices have been developed and widely used as replacements for cathode ray tubes (CRTs). Such display devices include flat panel displays (FPDs), e.g., liquid crystal displays, plasma display panels, electroluminescence displays and field emission displays, and vacuum fluorescent displays. These display devices necessarily include fluorescent films and thus their luminescent properties are dependent on the physical properties of the fluorescent films.

Sulfide phosphors, such as $SrGa_2S_4$, are widely used in the fields of field emission displays and cathodoluminescent displays. Fluorescent films for a variety of display devices are produced by preparing a phosphor paste composition comprising a phosphor, uniformly applying the phosphor paste composition to a given support, and drying the coated support. Representative sulfide phosphor paste compositions are composed of a mixture of a solvent, a binder, and a sulfide phosphor, and optionally comprise a dispersant for improving the dispersibility of the phosphor.

Such sulfide phosphor pastes tend to react with moisture or be chemically unstable in organic solvents (e.g., ethyl cellulose, terpineol and butyl carbitol acetate (BCA)) used in the preparation of the pastes. Some constituent components of sulfide phosphor paste compositions may be completely dissolved in solvents, such as ethyl cellulose, thus deteriorating the luminescent properties of display devices comprising fluorescent films produced from the compositions.

Where the viscosity reduction effect of dispersants in sulfide phosphor pastes is insufficient, the phosphors are inevitably used in relatively small amounts. Conversely, since an increased loading amount of phosphors can cause an increase in the viscosity of sulfide phosphor pastes, the workability of fluorescent films prepared therefrom is poor, e.g., through formation of non-uniform fluorescent films, leading to low yields and low productivity of the fluorescent films.

BRIEF SUMMARY OF THE INVENTION

Therefore, the present invention has been made in view of the above problems of the prior art, and it is one object of the present invention to provide a sulfur-containing dispersant capable of improving the dispersibility of particulate materials, including phosphors for use in a sulfide phosphor paste composition. It is another object of the present invention to provide a sulfide phosphor paste composition having superior dispersibility and uniform physical properties.

It is another object of the present invention to provide a high-luminance fluorescent film having excellent processability.

It is yet another object of the present invention to provide a display device comprising the fluorescent film.

In accordance with one aspect of the present invention for achieving the above objects, there is provided a dispersion composition comprising a sulfur-containing dispersant which has a dual head structure containing both a carboxyl group and a thiol group, or a structure containing a thiol or thiophene group as a head group; a particulate material; and an organic solvent.

In accordance with another aspect of the present invention, there is provided a sulfide phosphor paste composition comprising the sulfur-containing dispersant, a binder solution of an organic binder in a solvent, and a phosphor.

The phosphor paste composition may comprise 40-70% by weight of the phosphor and 0.1-3% by weight of the dispersant with respect to the phosphor powder, based on the weight of sulfur-containing dispersant, phosphor, and binder solution.

In accordance with another aspect of the present invention, there is provided a fluorescent film formed from the phosphor paste composition by a known process.

In accordance with yet another aspect of the present invention, there are provided display devices, such as cathodoluminescent displays, liquid crystal displays and electroluminescence displays, which comprise the fluorescent film.

BRIEF DESCRIPTION OF THE DRAWINGS

The above and other objects, features and other advantages of the present invention will be more clearly understood from the following detailed description taken in conjunction with the accompanying drawings, in which:

FIG. 4B is an enlarged partial view of the graph shown in FIG. 4a.

DETAILED DESCRIPTION OF THE INVENTION

Figure 1:
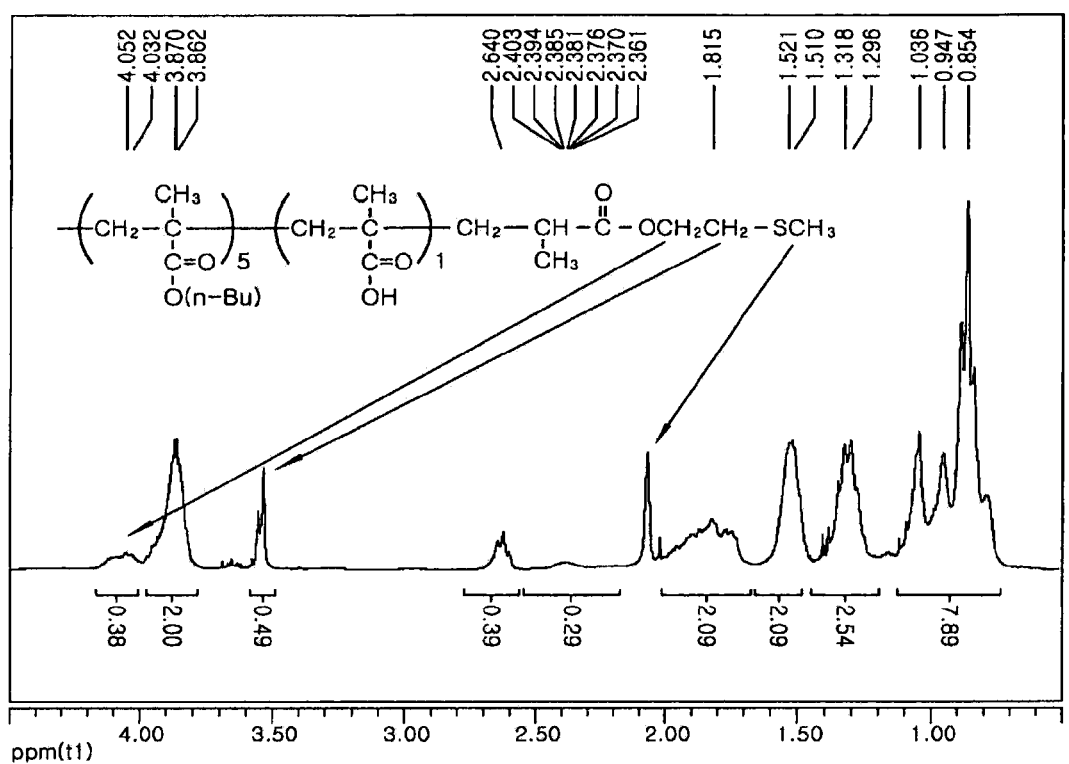
FIG. 1 is a $^1$H-NMR spectrum of a sulfur-containing dispersant synthesized in Preparative Example 1 of the present invention.

It will be understood in the following disclosure of the present invention, that when an element or layer is referred to herein as being "disposed on" another element or layer, the element or layer is in at least partial contact with another element or layer, and there are no intervening elements or layers present. As used herein, the term "and/or" includes any and all combinations of one or more of the associated listed items.

It will also be understood that, although the terms first, second, third, etc., may be used herein to describe various elements, processes, components, and/or layers, these elements, processes, components, and/or layers should not be limited by these terms.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention will now be described in more detail.

A sulfur-containing dispersant as disclosed herein has a dual head structure containing both a carboxyl group and a thiol group or a structure containing a thiol or thiophene group as a head group.

Specifically, the sulfur-containing dispersant comprises: a compound of Formula 1

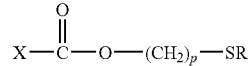

(1)

wherein
X is substituted $C_{1\sim200}$ alkyl, unsubstituted $C_{1\sim200}$ alkyl, substituted aryl, unsubstituted aryl, substituted arylalkyl, or unsubstituted arylalkyl,
R is H or methyl, and
P is a number from 1 to 10;
a compound of Forula 2

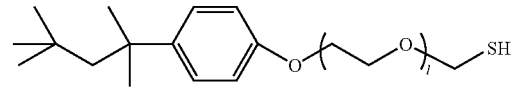

(2)

wherein 1 is a number from 1 to 20;
a compound of Formula 3

$$CH_3(CH_2)_{10}CH_2-SH \qquad (3);$$

a compound of Formula 4

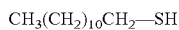

(4)

or a combination comprising at least one of the foregoing compounds.

The sulfur-containing dispersant serves to improve the dispersibility of a sulfide phosphor paste composition and permits an increase in the amount of the phosphor used while maintaining the viscosity of the phosphor paste composition at a constant level. Accordingly, a phosphor paste composition comprising the sulfur-containing dispersant can be used to produce a fluorescent film or a display device having improved luminance.

More specifically, the dispersant of Formula 1 can be represented by Formula 5 below:

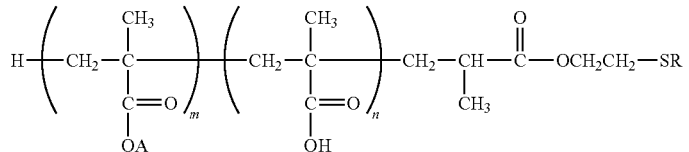

(5)

wherein A is H or $C_{1~12}$ alkyl, m and n are each independently a number from 1 to 20, and R is as defined in Formula 1.

In an exemplary embodiment, a dispersant of Formula 5 can be synthesized by Reaction Scheme 1 below.

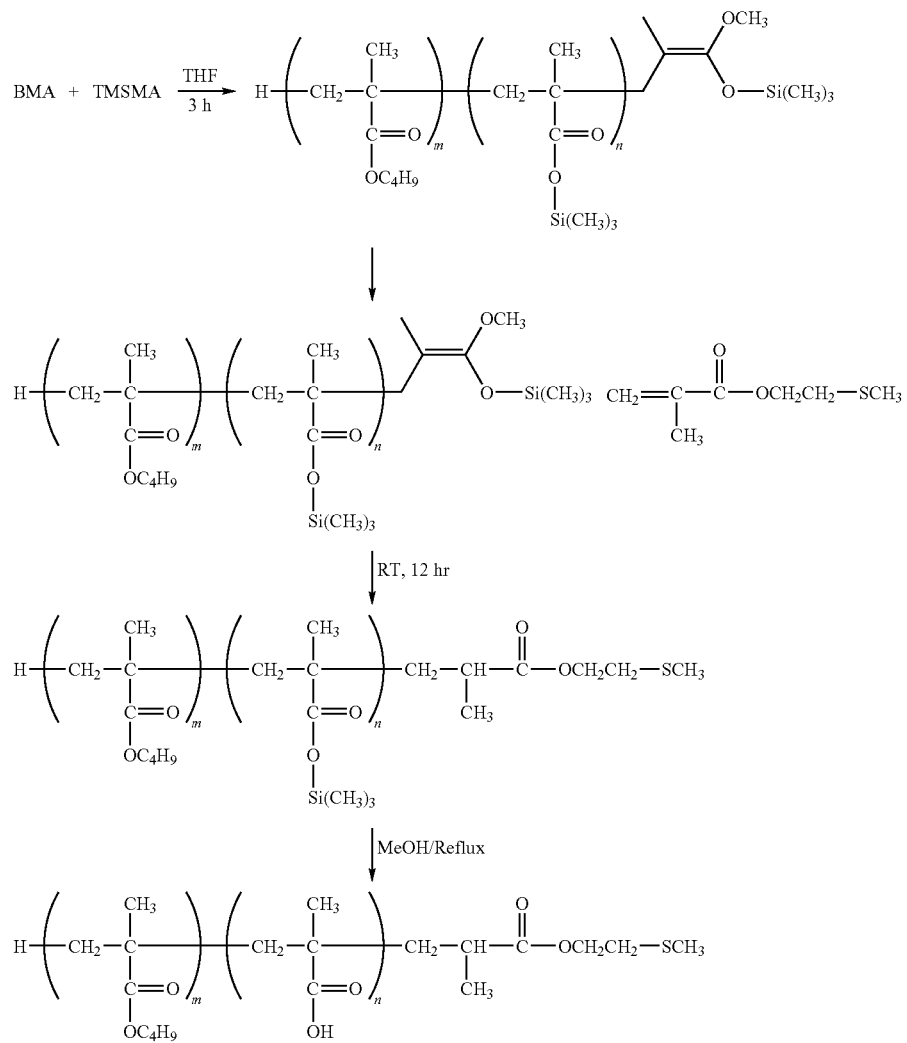

wherein BMA represents butyl methacrylate, TMSMA represents trimethylsilyl methacrylate, and m and n are as defined in Formula 5.

The sulfur-containing dispersant is useful in dispersion compositions including sulfide phosphor paste compositions, but is not limited thereto. The sulfur-containing dispersant can be added to any dispersion in which particulate materials, including nanomaterials such as inorganic nanoparticles, are dispersed in organic solvents. As used herein, the term "nanomaterials" refers to particulate materials having an average largest dimension of less than 1,000 nanometers (nm), specifically less than or equal to 500 nm, and more specifically less than or equal to 100 nm.

The present invention provides a phosphor paste composition comprising a binder solution and a phosphor, in addition to the sulfur-containing dispersant. The components other than the sulfur-containing dispersant may be identical or similar to those used in conventional phosphor paste compositions.

The binder solution includes a solvent and an organic binder. The organic binder functions to impart the viscosity of the phosphor paste composition after being dissolved in the solvent and to impart a binding force to the components after the phosphor paste composition is dried. Examples of organic binder resins that can be used in the present invention include, but are not limited to, acrylic polymers, styrenic polymers, cellulose polymers, methacrylic ester polymers, styrene-acrylic ester copolymers, and polycarbonate polymers. Exemplary binders include polystyrene, polyvinylbutyral, polyvinyl alcohol, polyethylene oxide, polypropylene carbonate, polymethylmethacrylate, and ethyl cellulose. Combinations comprising at least one of the foregoing organic binders may also be used. In an embodiment, cellulose polymers, such as for example ethyl cellulose, are preferred upon screen printing.

Taking into consideration the kinds of the phosphor and the organic binder and the desired physical properties of the phosphor paste composition, the solvent used to prepare the binder solution can be selected from commercially available solvents and solvent mixtures. There is no particular restriction as to the kind of solvents that can be used in the phosphor paste composition of the present invention, but it is preferred to use solvents that are volatilized at 150° C. or higher.

Exemplary solvents include aromatic hydrocarbon compounds, e.g., toluene and xylene, ether compounds, e.g., tetrahydrofuran and 1,2-butoxyethane, ketone compounds, e.g., acetone and methyl ethyl ketone, ester compounds, e.g., ethyl acetate, butyl acetate and butyl carbitol acetate (BCA), alcohol compounds, e.g., isopropyl alcohol, diethylene glycol monobutyl ether, terpineol and 2-phenoxyethanol, and the like. A preferred mixed solvent consists of terpineol and butyl carbitol acetate in a mixing ratio of 1:1 (w/w) to 1:2.5 (w/w) and preferably 1:1.7 (w/w).

The binder solution includes 1.5-5% by weight of the organic binder and the remainder of solvent, based on the combined weights of organic binder and solvent. When the organic binder is used in an amount of less than 1.5% by weight, the amount of the solvent used is relatively large compared to that of the organic binder, leading to a deterioration in the coating quality of a fluorescent film. Meanwhile, when the organic binder is used in an amount exceeding 5% by weight, the content of the solvent is lower relative to the organic binder, thus reducing the amount of the phosphor used in the phosphor paste composition.

The phosphor used in the phosphor paste composition is not specially restricted so long as it is used to prepare conventional phosphor paste compositions. There is no restriction as to the kind and composition of the phosphor used in the present invention. Since the phosphor paste composition is mainly used to form fluorescent films for display devices, such as cathodoluminescent displays, liquid crystal displays and electroluminescence displays, the kind and composition of the phosphor may be suitably selected according to the kind of excitation sources used in the display devices to excite the fluorescent films formed from the phosphor paste composition.

Specifically, as suitable phosphors, there can be used commercially available red, green and blue phosphors in the form of oxide solid solutions that are currently used in display devices. A preferred phosphor is a mixture of oxides of barium, magnesium and aluminum in the form of a solid solution. Particularly, the dispersant can be added to a paste composition comprising a sulfide phosphor, such as $SrGa_2S_4$ or $La_2O_2S$, to further improve the dispersibility of the composition.

More specifically, examples of sulfide phosphors that can be used in the present invention include, but are not limited to, $SrS:Eu^{2+}$, $SrGaS:Eu^{2+}$, $SrGa_2S_4$, $SrCaS:Eu^{2+}$, $ZnS:Ag^+$, $CaS:Eu^{2+}$, $ZnS:Cu^+Al^{3+}$, $ZnS:Ag^+,Cl^-$, $La_2O_2S$, $La_2O_2S:Eu^{3+}$, $Y_2O_2S:Eu^{3+}$, $CaAl_2S_4$, and $BaAl_2S_4:Eu^2$ The phosphor paste composition may further comprise at least one additive selected from plasticizers, leveling agents, lubricants, antifoamers and the like so long as the physical properties of the composition are not significantly adversely affected.

The phosphor paste composition may comprise 40-70% by weight of the phosphor and 0.1-3% by weight of the dispersant with respect to the phosphor powder, based on the weight of sulfur-containing dispersant, phosphor, and binder solution. When the content of the dispersant is less than 0.1% by weight, the amount of the phosphor used is relatively increased and thus the viscosity of the phosphor paste composition is not maintained at a constant level. Also, when the content of the dispersant exceeds 3% by weight, the contents of the other components such as the phosphor and organic binder decrease relative to the dispersant, and the physical properties of the phosphor paste composition may be adversely affected.

Typically, the amount of phosphor dispersed in a similar phosphor paste composition but using non-sulfur-containing dispersants can be less than 40% by weight based on the weight of phosphor, dispersant, and binder solution. However, use of the sulfur-containing dispersants disclosed herein can allow an increase in the phosphor content of the phosphor paste composition to 40-70% by weight, based on the weight of phosphor, dispersant, and binder solution. The increased phosphor content in the phosphor paste composition can improve the luminance of a fluorescent film formed from the phosphor paste composition.

The phosphor paste composition can be prepared by adding the dispersant to the binder solution and adding the phosphor powder thereto. Specifically, the phosphor paste composition can be prepared in accordance with the following procedure. First, an organic binder, such as ethyl cellulose, is dissolved in a mixed solvent of butyl carbitol acetate and α-terpineol. Then, to the solution are added the sulfur-containing dispersant and an additive, such as an antifoamer or a lubricant, followed by the addition of a phosphor. The resulting mixture is homogeneously dispersed using a mill, such as a 3-roll mill, to prepare the final phosphor paste composition.

In another aspect, the present invention is directed to a fluorescent film produced from the phosphor paste composition. The fluorescent film is produced by applying the phosphor paste composition to a support, such as glass or transparent plastic, to form a particular pattern thereon and heating the coated support by drying and baking to remove volatiles (e.g., solvent) and harden the phosphor paste. The phosphor paste composition desirably forms a uniform, low defectivity layer on the support. Thus, in an embodiment, a fluorescent film comprises a phosphor layer comprising the phosphor, the organic binder, and the sulfur-containing dispersant, and the support, wherein the phosphor layer is disposed on and in at least partial contact with the support.

The fluorescent film can be produced and patterned using known techniques, including but not limited to pattern screen printing, electrophoresis, photolithography, ink jet, and the like.

Since the fluorescent film produced from the phosphor paste composition comprising the sulfur-containing dispersant enables the use of a larger amount of the phosphor in proportion to the amounts of organic binder and sulfur-containing dispersant, the luminance is thereby improved, whereas any increase in viscosity is relatively limited and does not significantly adversely affect the coating properties and/or uniformity of the phosphor paste composition and any fluorescent film prepared therefrom. Thus, the processability of the fluorescent film is improved.

The fluorescent film can be used for the fabrication of a variety of display devices, including cathodoluminescent displays, liquid crystal displays, electroluminescence displays, field emission displays and vacuum fluorescent displays. Display devices comprising the fluorescent film exhibit improved luminescent properties and uniform physical properties.

The present invention will be explained in more detail with reference to the following examples illustrating preferred embodiments of the present invention. These examples are given for the purpose of illustration and are not to be construed as limiting the scope of the invention.

PREPARATIVE EXAMPLE 1

Preparation of Sulfur-Containing Dispersant of the Formula (6)

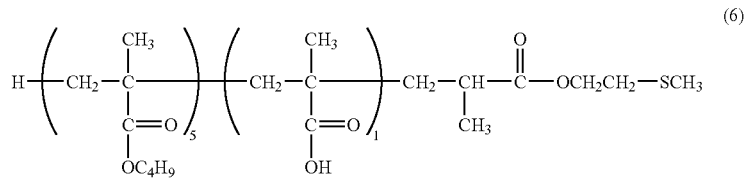

Methyl trimethylsilyl dimethylketene acetal (3.48 g, 20 mmol, Aldrich) as an initiator, tetrabutylammonium-3-chlorobenzoate (0.8 g, 0.2 mmol) as a catalyst, and purified acetonitrile (0.5 ml) were placed in a 50 ml round-bottom flask, and stirred using a magnetic bar for one hour. To the reaction solution was slowly added a solution of butyl methacrylate (BMA, 8.18 g, 57.5 mmol, Aldrich) and trimethylsilyl methacrylate (TMSMA, Aldrich) in purified THF (3 ml). The resulting mixture was stirred for 2 hours. After the disappearance of the butyl methacrylate and trimethylsilyl methacrylate was confirmed by gas chromatography (GC), a solution (0.5 ml) of tetrabutylammonium-3-chlorobenzoate (0.8 g, 0.2 mmol) in acetonitrile was added thereto. To the reaction solution was added a solution of 2-(methylthio)ethyl methacrylate (1.6 g, 10 mmol) in purified THF (2 ml). After the resulting mixture was stirred for 2 hours, the solvents were removed using a rotary evaporator. The obtained residue was dissolved in methanol and refluxed at 70° C. for 3 hours. The methanol was removed from the reaction solution using a rotary evaporator. The obtained residue was dissolved in methylene chloride, washed with distilled water, and filtered. After the methylene chloride was removed from the filtrate using a rotary evaporator, the obtained residue was dried in a vacuum oven for 12 hours, yielding a dispersant (9.2 g) as a viscous oil. The structure of the dispersant (6) was identified by $^1$H-NMR spectroscopy (FIG. 1).

EXAMPLE 1

A commercially available $SrGa_2S_4$ powder (KX501A Kasei Optonix Ltd., Japan) was used as a phosphor. The phosphor powder was dried in a vacuum at 130° C. for 24 hours before use Separately, 0.51 g of ethyl cellulose as an organic binder was dissolved in a mixed solvent of α-terpineol (4.61 g) and butyl carbitol acetate (7.68 g) to prepare a binder solution. The phosphor powder was added to the binder solution, and then the sulfur-containing dispersant prepared in Preparative Example 1 was added thereto. The resulting mixture was milled to prepare a phosphor paste composition of the present invention.

EXAMPLES 2 AND 3

Phosphor paste compositions were prepared in the same manner as in Example 1, except that 1-dodecanethiol (1-dodecanethiol, Aldrich, USA) (Example 2) of Formula 3 and 3-dodecylthiophene (1-dodecanethiol, Aldrich, USA) (Example 3) of Formula 4 were used as dispersants.

COMPARATIVE EXAMPLE 1

A phosphor paste composition was prepared in the same manner as in Example 1, except that no dispersant was used.

EXAMPLES 4 TO 6

Phosphor paste compositions were prepared in the same manner as in Examples 1 to 3, respectively, except that a $La_2O_2S$ powder (KX-681, Kasei, Japan) was used as a phosphor.

COMPARATIVE EXAMPLE 2

A phosphor paste composition was prepared in the same manner as in Comparative Example 1, except that a $La_2O_2S$ powder (KX-681, Kasei, Japan) was used as a phosphor.

EXPERIMENTAL EXAMPLE 1

Evaluation of Changes in Viscosity of Phosphor Paste Compositions

Figure 2:
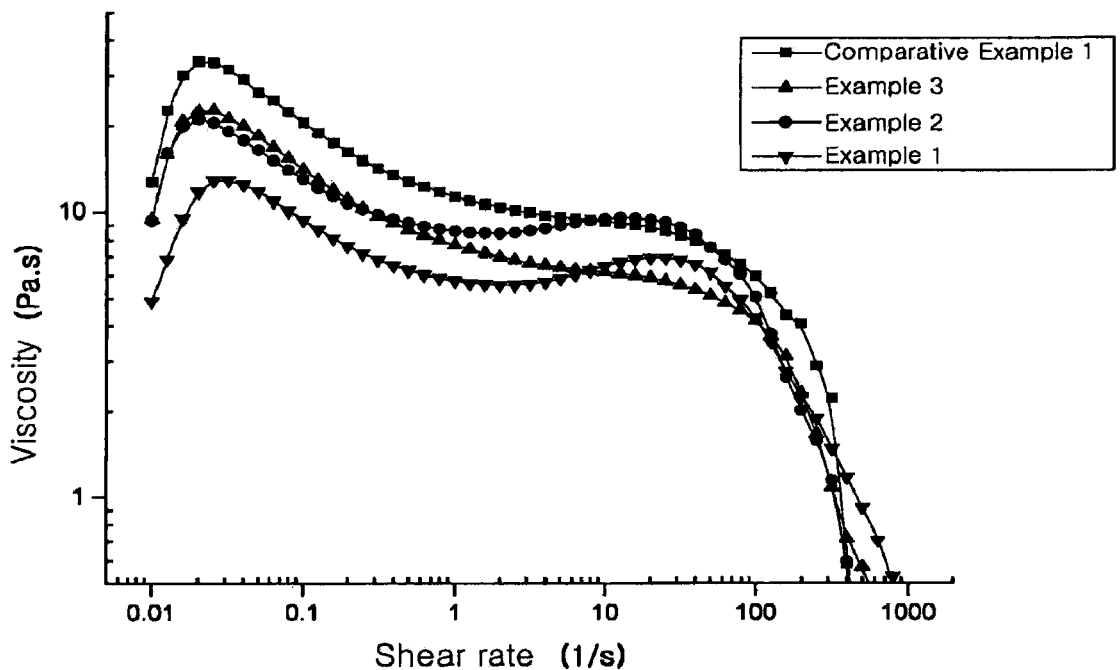
FIG. 2 is a graph showing changes in viscosity according to the changes in the shear rate of phosphor paste compositions prepared in Examples 1 to 3 and Comparative Example 1.

Changes in viscosity with increasing shear rates of the phosphor paste compositions prepared in Examples 1 to 3 and Comparative Example 1 were measured, and the obtained results are shown in FIG. 2. The viscosity was measured using a viscometer (AR2000, Thermal Analysis, USA). The measurement was done using a #14 spindle at 24.5-25.5° C. for 30 seconds. For comparison, changes in the viscosity of the phosphor paste prepared in Comparative Example 1 were measured according to changes in shear rate, and the results are shown in FIG. 2.

The graph shown in FIG. 2 demonstrates that the phosphor paste composition of Example 1 using the sulfur-containing dispersant exhibits distinct viscosity reduction effect when compared to the phosphor paste composition prepared in Comparative Example 1.

These results suggest that the phosphor paste compositions comprising the dispersants permit the use of a larger amount of the phosphor, thus improving the luminescent properties of fluorescent films produced from the compositions.

EXPERIMENTAL EXAMPLE 2

Evaluation of Changes in Viscosity of Phosphor Paste Compositions

Figure 3:
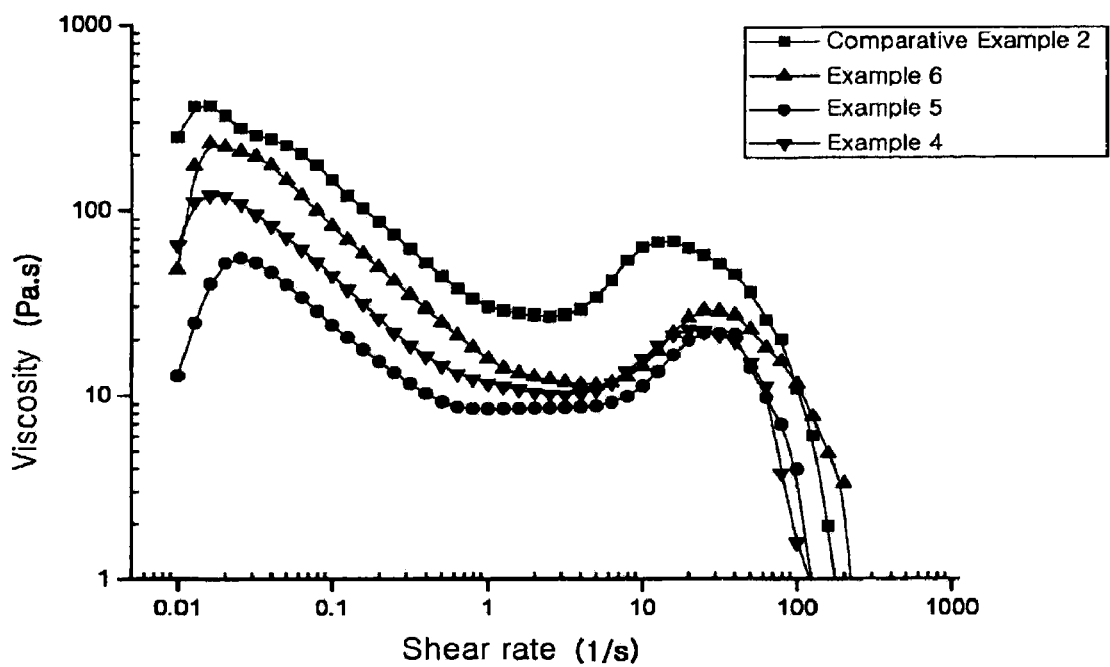
FIG. 3 is a graph showing changes in viscosity according to the changes in the shear rate of phosphor paste compositions prepared in Examples 4 to 6 and Comparative Example 2.

Changes in viscosity with increasing shear rates of the phosphor paste compositions prepared in Examples 4 to 6 and Comparative Example 2 were measured by the same procedure as described in Experimental Example 1. The results are shown in FIG. 3. The graph shown in FIG. 3 demonstrates that the phosphor paste composition of Example 5 using the sulfur-containing dispersant exhibits distinct viscosity reduction effect when compared to the phosphor paste composition prepared in Comparative Example 2.

These results suggest that the phosphor paste compositions comprising the sulfur-containing dispersants permit the use of a larger amount of the phosphor, thus improving the luminescent properties of fluorescent films produced from the compositions.

EXPERIMENTAL EXAMPLE 3

Evaluation of Luminescent Properties of Phosphor Paste Compositions

Each of the phosphor paste compositions prepared in Examples 1 and 2 and Comparative Example 1 was coated using a film applicator (BYK-Gardner®) to a thickness of 30 μm on a glass support. The coating layer was fired to 480° C. at a rate of 5° C./min. using a lamp to form a fluorescent film. The luminescent properties of the fluorescent film were evaluated.

The evaluation of the luminescent properties was conducted using a Phosphor of Emission and Decay Measurement System (an assembly of a VUV excimer lamp (USHIO, Japan) and a vacuum chamber system (Motech vacuum, Korea)) under the following conditions:

Vacuum pressure: 3-10 torr
Light source wavelength: 146 nm
Wavelength range: 230-780 nm
Wavelength interval: 1 nm.

Figure 4A:
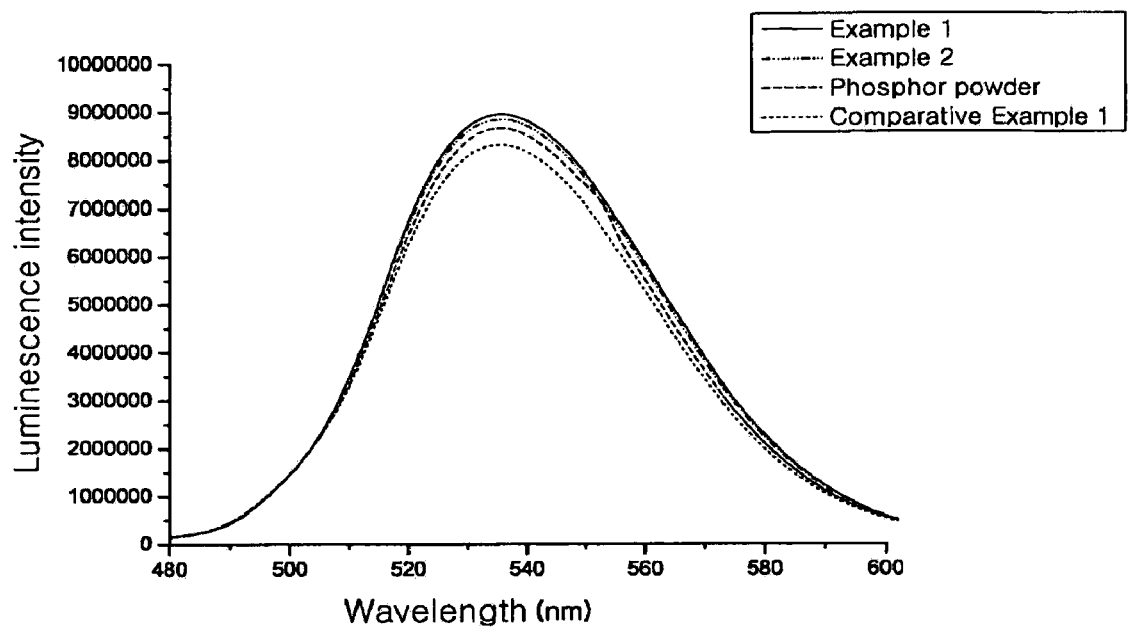
FIG. 4A is a graph showing the luminescent properties of fluorescent films produced from phosphor paste compositions prepared in Examples 1 and 2 and Comparative Example 1.
Figure 4B:
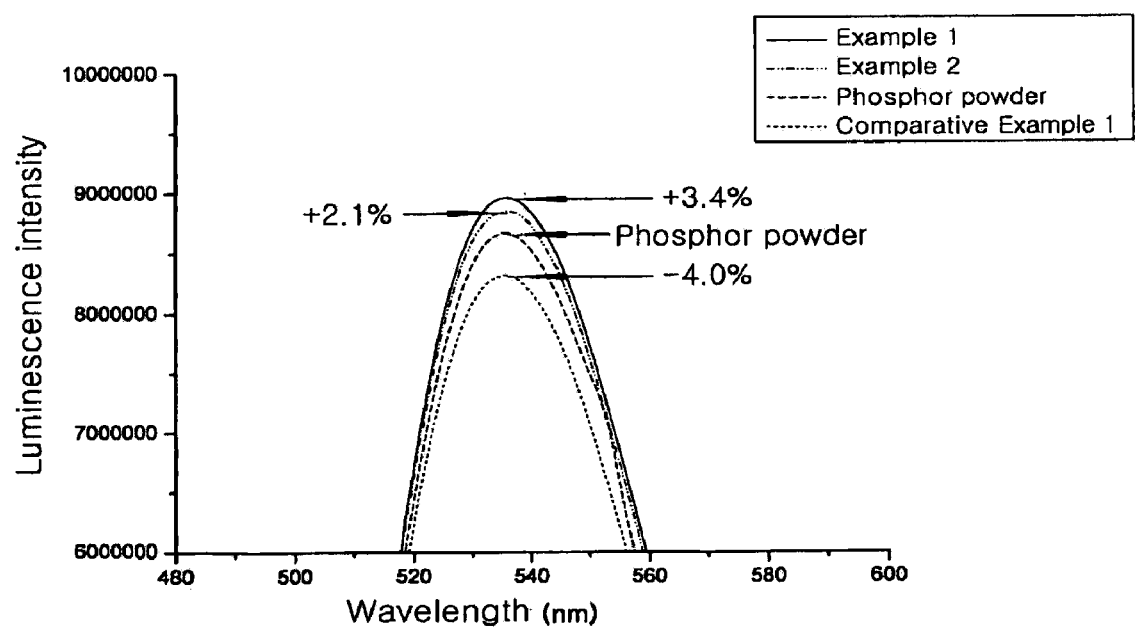

The results are shown in FIG. 4a. FIG. 4b is an enlarged partial view of the graph shown in FIG. 4a. For comparison, the luminescent properties of the phosphor powder used in Example 1 were measured and the obtained results are shown in the figures.

As shown in FIGS. 4a and 4b, the maximum luminescence intensity of the compositions (Examples 1 and 2) prepared using the sulfur-containing dispersants is increased by 3.4% and 2.1%, respectively, compared to that of the phosphor powder. In contrast, the maximum luminescence intensity of the composition (Comparative Example 1) using no dispersant is decreased by 4.0%, compared to that of the phosphor powder. These results show that the phosphor paste compositions comprising the dispersants exhibit improved luminescence intensity as compared to conventional phosphor paste compositions.

EXPERIMENTAL EXAMPLE 4

Evaluation of Luminescent Properties of Phosphor Paste Compositions

The luminescent properties of the phosphor paste compositions prepared in Examples 4 and 5 and Comparative Example 2 were evaluated by the same procedure as described in Experimental Example 3.

Figure 5A:
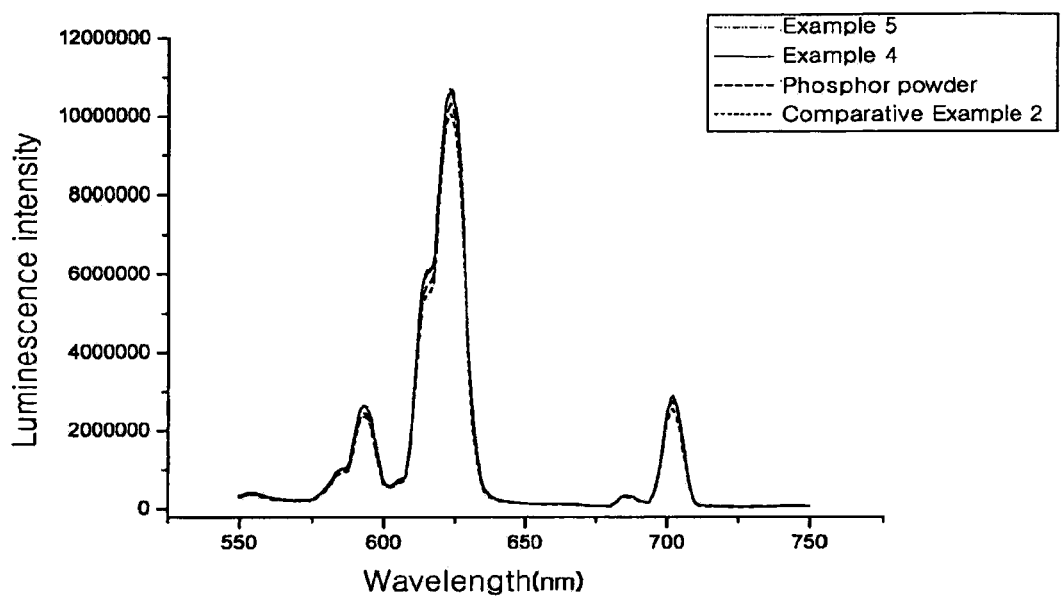
FIG. 5A is a graph showing the luminescent properties of fluorescent films produced from phosphor paste compositions prepared in Examples 4 and 5 and Comparative Example 2.
Figure 5B:
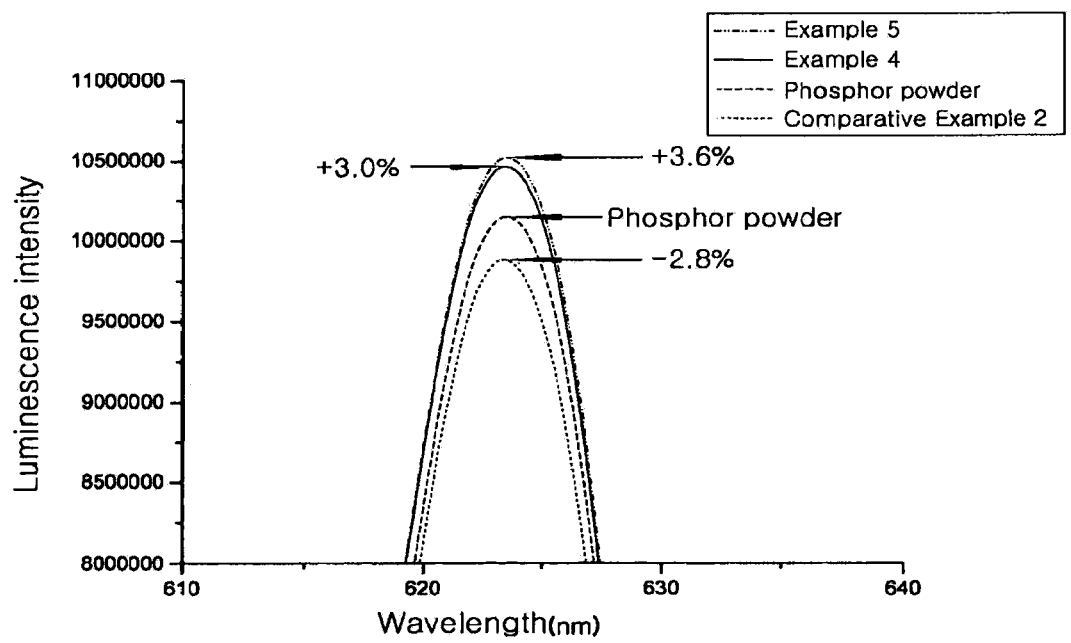
FIG. 5B is an enlarged partial view of the graph shown in FIG. 5A.

The results are shown in FIG. 5a. FIG. 5b is an enlarged partial view of the graph shown in FIG. 5a.

As shown in FIGS. 5a and 5b, the maximum luminescence intensity of the fluorescent films produced from the compositions (Examples 4 and 5) using the sulfur-containing dispersants is increased by 3.0% and 3.6%, respectively, compared to that of the phosphor powder. In contrast, the maximum luminescence intensity of the fluorescent film produced from the composition (Comparative Example 2) using no dispersant is decreased by 2.8%, compared to that of the phosphor powder. These results show that the phosphor paste compositions comprising the dispersants improve the luminescence intensity of fluorescent films as compared to conventional phosphor paste compositions.

Although the preferred embodiments have been disclosed for illustrative purposes, those skilled in the art will appreciate that various modifications and variations are possible, without departing from the scope and spirit of the invention as disclosed in the appended claims. Accordingly, such modifications and variations are intended to come within the scope of the appended claims.

As apparent from the above description, the novel sulfur-containing dispersant has advantages that it improves the dispersibility of a phosphor paste composition and solves the problem of oxidation arising from the use of organic solvents. Particularly, the sulfur-containing dispersant exhibits superior effects when it is used to prepare a sulfide phosphor paste composition.

Since the phosphor paste composition comprising the sulfur-containing dispersant has improved dispersibility and constant viscosity, it permits the use of a larger amount of a phosphor, thus enabling the formation of uniform fluorescent films having improved luminescent properties. Therefore, according to the present invention, display devices, such as LCDs, having high luminance and excellent processability can be fabricated.

What is claimed is:

1. A fluorescent film comprising:
    a phosphor layer comprising
        a phosphor,
        an organic binder, and
        a sulfur-containing dispersant selected from the group consisting of:
            a compound of Formula (1)

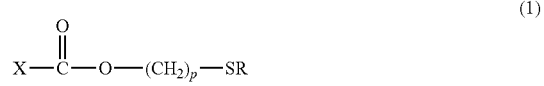

(1)

wherein
    X is substituted $C_{1\sim200}$ alkyl, unsubstituted $C_{1\sim200}$ alkyl, substituted aryl, unsubstituted aryl, substituted arylalkyl, or unsubstituted arylalkyl, R is H or methyl, and P is a number from 1 to 10;
    a compound of Formula (2)

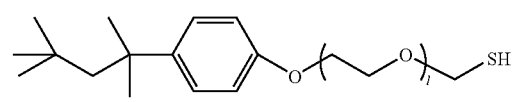

(2)

wherein l is a number from 1 to 20;
    and a combination comprising at least one of the foregoing compounds; and
    a support;
wherein the phosphor layer is disposed on and in at least partial contact with the support.

2. A sulfur-containing dispersant represented by Formula 5:
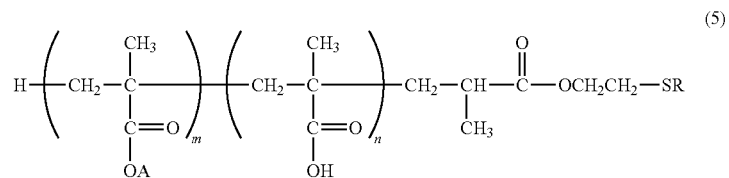
wherein
A is H or $C_{1\sim12}$ alkyl,
m and n are each independently 1 to 20, and R is H or methyl.
* * * * *